United States Patent
Perkuhn et al.

(10) Patent No.: US 9,185,141 B2
(45) Date of Patent: Nov. 10, 2015

(54) MANAGING ROAMING AGREEMENTS BETWEEN IMS NETWORKS

(75) Inventors: Heiko Perkuhn, Aachen (DE); Marc Vorwerk, Köln (DE); Rene Rembarz, Aachen (DE); Rosa Maria Martinez Perallon, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 300 days.

(21) Appl. No.: 13/320,950

(22) PCT Filed: May 19, 2009

(86) PCT No.: PCT/EP2009/003584
§ 371 (c)(1),
(2), (4) Date: Mar. 19, 2012

(87) PCT Pub. No.: WO2010/133239
PCT Pub. Date: Nov. 25, 2010

(65) Prior Publication Data
US 2012/0185578 A1     Jul. 19, 2012

(51) Int. Cl.
*G06F 15/173* (2006.01)
*H04L 29/06* (2006.01)
*H04W 8/06* (2009.01)

(52) U.S. Cl.
CPC ........ *H04L 65/1016* (2013.01); *H04L 65/1073* (2013.01); *H04W 8/06* (2013.01); *H04L 65/1033* (2013.01); *H04L 65/1036* (2013.01)

(58) Field of Classification Search
CPC ............ H04L 65/1016; H04L 65/1033; H04L 65/1036; H04L 65/04; H04L 65/1073; H04L 65/1089
USPC ................. 709/220, 221, 222, 223, 224, 225
See application file for complete search history.

(56) References Cited

U.S. PATENT DOCUMENTS 6,826,167 B2 *   11/2004   Osafune et al. ............... 370/338
7,277,702 B2   10/2007   Ropolyi et al.
(Continued)

FOREIGN PATENT DOCUMENTS

| WO | 0070798 A1 | 11/2000 |
| WO | 02102107 A1 | 12/2002 |
| WO | 2009/042670 A1 | 4/2009 |

OTHER PUBLICATIONS

Garcia, M. "Private Session Initiation Protocol Extension for Visited Network Identifier." IETF Network Working Group, Internet Draft, <draft-garcia-sip-visited-network-id-01.txt>, May 2002.
(Continued)

*Primary Examiner* — Dhairya A Patel
(74) *Attorney, Agent, or Firm* — Coats & Bennett, P.L.L.C.

(57) ABSTRACT

A technique for managing an automatically established roaming agreement between two IMS networks (102, 104) is described, wherein one IMS network (102) supports multiple proxy nodes (302, 106) at the network edge towards the other IMS network (104). A method embodiment of the technique is performed in an I-CSCF (302) of the first IMS network (102) and comprises the steps of receiving (316) a registration request of an UE (306) via a second IMS network (104); sending (324) a roaming information request indicating the second IMS network (104) to a HSS (110) associated with the first IMS network (102); receiving (326) from the HSS (110) a roaming information answer indicating information related to the roaming agreement, and forwarding (328), based on the roaming information answer, the registration request to a second I-CSCF (106) of the first IMS network (102) managing the roaming agreement.

26 Claims, 10 Drawing Sheets

(56) References Cited

U.S. PATENT DOCUMENTS

| | | | |
|---|---|---|---|
| 2002/0072367 A1* | 6/2002 | Osafune et al. | 455/433 |
| 2004/0243711 A1* | 12/2004 | Rajaniemi | 709/227 |
| 2006/0252424 A1* | 11/2006 | Ohno et al. | 455/432.1 |
| 2006/0268835 A1* | 11/2006 | Hyotylainen et al. | 370/352 |
| 2007/0207818 A1 | 9/2007 | Rosenberg et al. | |
| 2008/0004006 A1* | 1/2008 | Datta et al. | 455/432.1 |
| 2008/0039081 A1 | 2/2008 | Ma et al. | |
| 2008/0064398 A1 | 3/2008 | Zhu | |
| 2008/0176589 A1* | 7/2008 | Bantukul | 455/466 |
| 2008/0194255 A1 | 8/2008 | Walker et al. | |
| 2008/0274735 A1 | 11/2008 | Choksi et al. | |
| 2009/0093249 A1 | 4/2009 | Zhu et al. | |
| 2009/0103458 A1* | 4/2009 | Charzinski et al. | 370/259 |
| 2009/0172138 A1* | 7/2009 | Wang et al. | 709/223 |
| 2009/0264096 A1* | 10/2009 | Cai et al. | 455/406 |
| 2010/0085937 A1* | 4/2010 | Pressley et al. | 370/331 |

OTHER PUBLICATIONS

ZTE, "Proposal on VPLMN Advertisement and Selection Procedure", 3GPP TSG-SA2 Meeting #35, Oct. 27-31, 2003, Bangkok, Thailand.

Ericsson et al., Clarification of HSS Role in SIP Registration procedure, 3GPP TSG SA2 #14, Sep. 4-8, 2000, Bristol.

3rd Generation Partnership Project, "Technical Specification Group Services and System Aspects; IP Multimedia Subsystem (IMS); Stage 2", Mar. 2009, p. 64, 3GPP TS 23.228 V8.8.0 (Release 8).

3rd Generation Partnership Project, "Technical Specification Group Services and System Aspects; Network composition feasibility study", Jun. 2007, p. 20, 3GPP TR 22.980 V8.1.0 (Release 8).

Ericsson, "Network initiated de-registration procedure", 3GPP TSG SA2, Oct. 9-12, 2000, Sofia-Antipolis.

Roach, A., "Session Initiation Protocol (SIP)—Specific Event Notificaiton", Network Working Group Request for Comments: 3265, Jun. 1, 2002, pp. 1-36, Category: Standards Track, The Internet Society.

\* cited by examiner

| Information element name | Mapping to Diameter AVP | Cat. | Description |
|---|---|---|---|
| Visited Network Identifier | Visited Network-Identifier | M | Identifier that allows the home network to identify the visited network |

Fig. 4a

| Information element name | Mapping to Diameter AVP | Cat. | Description |
|---|---|---|---|
| Result | Result-Code / Experimental Result | M | Result of the operation. Result-Code AVP shall be used for errors defined in the Diameter Base Protocol |
| Roaming Template | Roaming Data | O | If there is not roaming yet for the current visited network, the roaming template must be sent in order to start a negotiation |
| Roaming State | Roaming State | M | If there is already a roaming for the current visited network, the state must be sent |
| Roaming Handler | Roaming Handler | O | I-CSCF which handles the current roaming with the visited network |

Fig. 4b

MANAGING ROAMING AGREEMENTS BETWEEN IMS NETWORKS

TECHNICAL FIELD

The invention relates to techniques for managing roaming agreements between IP Multimedia Subsystem (IMS) networks. More specifically, the invention relates to techniques for managing an automatically established roaming agreement between two IMS networks, wherein one IMS network supports multiple proxy nodes at the network edge towards the other IMS network.

BACKGROUND

The IP multimedia subsystem (IMS) is a specific domain in mobile communication networks such as in General Packet Radio Service (GPRS) and Universal Mobile Tele-communication Systems (UMTS) networks. IMS enables the centralized provision of multimedia and other services to users. IMS-based services may be used essentially independently of a particular access technique; for example, while normally the access will be based on a packet-based transport mechanism, a user may also access the IMS via a CS (Circuit Switched) domain of, e.g., a GSM network. Independent of the specific access chosen, a user has to register in IMS in order for a provision of IMS services. Registration and service provisioning to a specific user is controlled by a Serving Call State Control Function (S-CSCF) of the IMS.

Roaming scenarios as known for the provisioning of speech services, for example, are also relevant for the provisioning of IMS services. A user may attempt to register in its home IMS network via the IMS domain of a visited network. In this case, the user terminal sends its registration request to a Proxy CSCF (P-CSCF) of the visited network, which forwards the registration request to the user's home network. For this purpose, at least one Interrogating CSCF (I-CSCF) has to be available at the home IMS network, to which the P-CSCF sends the registration request. It is then the task of the I-CSCF to identify an appropriate S-CSCF of the home network and send the registration request thereto.

The prerequisite for such an IMS roaming scenario is that a roaming agreement is in place between the home network and the visited network which defines that and how a visiting user can access a desired service in its home network via the visited network. With regard to IMS services, today's roaming agreements often merely comprise a tunnelling approach, e.g. because the visiting network does not have an IMS. This means that the visiting user traffic is tunnelled from an SGSN (Serving GPRS Support Node) in the visited network to a GGSN (Gateway GPRS Support Node) in the home network. This solution may not assure a desired QoS (Quality of Service) for the user. Consider for example the case that a simple bearer for Best Effort QoS is provided in the visited network. This might not suffice for the service actually requested by the user from the home network, e.g. in case of a high band-width and/or low latency multimedia delivery session such as videotelephony.

The number of IMS domains increases and will most probably continue to increase in the future, including IMS networks with local and/or temporary coverage only which are enabled by cost-efficient "IMS in a box" solutions. In order to be able to flexibly provide multimedia services to the users it is a prerequisite that services can be provided with a desired quality to the IMS users and thus corresponding roaming agreements have to be in place. Currently, roaming agreements are normally set up manually. However, it appears unfeasible from a practical (business) perspective to manually manage the required numbers of roaming relationships in the future, not only in view of the generally increasing number of IMS domains, but in particular with regard to IMS domains which are only temporarily existing, for example for the duration of an exhibition, conference, cultural event, etc.

Moreover, it appears desirable to have the possibility to flexibly update an existing roaming agreement, for example in order to be able to flexibly react on short-term traffic peaks or temporary service offerings, which normally will not be achievable by manual administration of roaming agreements.

For these reasons, procedures for automatically establishing (and updating) roaming agreements between IMS networks are required. The 3GPP Technical Specifications TS 24.228 and TS 24.229 define IMS signalling flows, including signalling flows between IMS networks in case of roaming. However, in these specifications it is assumed that a roaming agreement is either in place or not, i.e. the procedures are based on manually established roaming agreements. The 3GPP Technical Report TR 22.971 describes a form of "automatic" roaming based on a central inter-network service point, which is provided to enable the establishment of roaming relations.

In the 3GPP TR 22.980, implementation examples for so-called Network Compositions are described. Such Compositions are based on a concept developed within the "Ambient Networks Project", in which a generic network architecture has been developed, including generalized control functions and standardized reference points between two networks. The concepts include a generic automatic negotiation procedure performed between networks, see for example the Ambient Networks Deliverable D3-G.1 "Design of Composition Framework" of November 2006, available online on http://www.ambient-networks.org/deliverables.html. However, while generic scenarios for automated roaming agreement negotiations are discussed, no practically applicable solutions for roaming agreements between IMS networks are provided.

In fact, in order that automatic establishment procedures for roaming agreements between IMS network become feasible, various problems remain to be solved in detail. Herein, in particular the following problem is considered: In many cases an IMS network will comprise multiple I-CSCFs as possible contact points for a P-CSCF from another IMS network. Multiple I-CSCFs may be provided, for example, for reasons of load balancing, reliability, etc. A P-CSCF querying for an I-CSCF will have assigned one of these multiple I-CSCFs according to, e.g., a round robin scheme.

However, in a straightforward extension of the scenarios discussed further above, a specific roaming agreement will be handled by one particular I-CSCF from the multiple I-CSCFs. In this case, the I-CSCF the address of which is provided to the P-CSCF will be in many cases not the I-CSCF in charge of handling the corresponding roaming agreement. This will result in inconsistent behaviour; for example, the contacted I-CSCF may try to establish a roaming agreement despite the fact that one is in place already, parallel existing roaming agreements may not be consistent with each other, such that a service with one or the other QoS might be provided at random chance to a roaming user, etc. The possibly complex situations with parallel setup and/or maintenance of multiple roaming agreements between two IMS networks will also result in a considerable processing resource usage in all of the nodes involved in managing the roaming agreements and in time delays when serving roaming users.

SUMMARY

There is a demand for a technique for consistently and efficiently managing roaming agreements between two IMS networks when one IMS network supports multiple proxy nodes, such as I-CSCFs.

This demand is satisfied by a first method for managing an automatically established roaming agreement in a first IP Multimedia Subsystem "IMS" network. The first method is performed in a first edge proxy of the first IMS network and comprises the steps of receiving a registration request of a user terminal via a second IMS network; sending, based on the registration request, a roaming information request indicating the second IMS network to a user database associated with the first IMS network; receiving, in response to the roaming information request, from the user database a roaming information answer indicating information related to the roaming agreement, and forwarding, based on the roaming information answer, the registration request to a second edge proxy of the first IMS network, wherein the second edge proxy is managing the roaming agreement between the first and second IMS network.

Any of the edge proxies may be implemented as an Interrogating Call State Control Function "I-CSCF", Interconnect Border Control Function "IBCF", or Session Border Gateway "SBG".

The above-mentioned demand is further satisfied by a second method for managing an automatically established roaming agreement in a first IP Multimedia Subsystem "IMS" network. The second method is performed in a user database associated with the first IMS network and comprises the steps of receiving, from a first edge proxy of the first IMS network, a roaming information request indicating a second IMS network; and sending, in response to the roaming information request, to the first edge proxy a roaming information answer indicating information related to the roaming agreement. The user database may be implemented as a Home Subscriber Server "HSS".

According to one or both of the first and the second method, the roaming information answer may indicate the second edge proxy. The roaming information answer may comprise an indication of a state of the dynamic roaming agreement. For example, the automatically established roaming agreement may be a dynamic roaming agreement with an expiry time, in which case the state of the roaming agreement may be, for example, one of 'in preparation', 'established', or 'expired'.

An implementation of the first method comprises, after the reception of the registration request and before the sending of the roaming information request, the steps of sending a routing permission request to the user database, the routing permission request requesting permission for routing the registration request to a user registrar of the first IMS network; and receiving, in response to the routing permission request, a routing permission response from the user database rejecting the requested permission; wherein the roaming information request is sent to the user database in response to the received rejecting routing permission response.

The user registrar may be implemented as a Serving Call State Control Function "S-CSCF". According to one variant of this implementation a single message comprising the routing permission request and the roaming information request is sent to the user database. The single message may for example represent a Diameter User Authorization Request command. Additionally or alternatively, only a roaming information answer and no routing permission response is received from the user database.

An implementation of the second method comprises the step of determining, based on the received routing permission request, if a permanent roaming agreement between the first and second IMS networks exists, wherein the rejecting routing permission response is sent because no permanent roaming agreement between the first and second IMS networks exists.

According to one or both of the first and the second method, the roaming information answer may optionally comprise a roaming agreement template for establishing a roaming agreement between the first and the second IMS network. Additionally or alternatively, the communication between the first edge proxy and the user database may be based on Diameter messages.

The above-discussed demand is still further satisfied by a third method for managing an automatically established roaming agreement in a first IP Multimedia Subsystem "IMS" network. The method is performed in a second edge proxy of the first IMS network and comprises the step of receiving a user terminal registration request from a first edge proxy of the first IMS network, wherein the registration request has been received by the first edge proxy via a second IMS network and is forwarded to the second edge proxy managing the roaming agreement between the first and second IMS network.

Moreover, the above-discussed demand is satisfied by a computer program product which comprises program code portions for performing the steps of one or more of the methods and method aspects described herein when the computer program product is executed on one or more computing devices, for example an edge proxy, user database or user registrar. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

The above demand is further satisfied by a node implementing a first edge proxy and adapted for managing an automatically established roaming agreement in a first IP Multimedia Subsystem "IMS" network. The node comprises a component adapted to receive a registration request of a user terminal via a second IMS network; a component adapted to send, based on the registration request, a roaming information request indicating the second IMS network to a user database associated with the first IMS network; a component adapted to receive, in response to the roaming information request, from the user database a roaming information answer indicating information related to the roaming agreement, and a component adapted to forward, based on the roaming information answer, the registration request to a second edge proxy of the first IMS network, wherein the second edge proxy is managing the roaming agreement between the first and second IMS network.

The node may further comprise a component adapted to send a routing permission request to the user database, the routing permission request requesting permission for routing the registration request to a user registrar of the first IMS network; and a component adapted to receive, in response to the routing permission request, a routing permission response from the user database rejecting the requested permission. The node may be adapted to send a single message comprising the routing permission request and the roaming information request sent to the user database.

Still further, the above-mentioned demand is satisfied by a node implementing a user database associated with a first IP Multimedia Subsystem "IMS" network and adapted for managing an automatically established roaming agreement in the first IMS network. This node comprises a component adapted to receive, from a first edge proxy of the first IMS network, a roaming information request indicating a second IMS network; and a component adapted to send, in response to the roaming information request, to the first edge proxy a roaming information answer indicating information related to the roaming agreement.

This node may further comprise a component adapted to receive a routing permission request from the first edge proxy, the routing permission request requesting permission for routing the registration request to a user registrar of the first IMS network; and a component adapted to send, in response to the routing permission request, a routing permission response to the first edge proxy rejecting the requested permission. The node may be adapted to receive a single message comprising the routing permission request and the roaming information request sent from the first edge proxy and may be further adapted to send only a roaming information answer and no routing permission response to the first edge proxy.

The nodes implementing the first edge proxy and the user database may be adapted to communicate with each other using the Diameter protocol.

The above-mentioned demand is further satisfied by a node implementing a second edge proxy and adapted for managing an automatically established roaming agreement in a first IP Multimedia Subsystem "IMS" network. The node comprises a component adapted to receive a user terminal registration request from a first edge proxy of the first IMS network, wherein the registration request has been received by the first edge proxy via a second IMS network and is forwarded to the second edge proxy managing the roaming agreement between the first and second IMS network.

BRIEF DESCRIPTION OF THE DRAWINGS

In the following, the invention will further be described with reference to exemplary embodiments illustrated in the figures, in which:

FIG. 4a illustrates an embodiment of an IE to be included in Roaming Information Request messages;

FIG. 4b illustrates embodiments of IEs to be included in Roaming Information Answer messages;

DETAILED DESCRIPTION

In the following description, for purposes of explanation and not limitation, specific details are set forth, such as a specific network structure, signalling protocols, etc., in order to provide a thorough understanding of the current invention. It will be apparent to one skilled in the art that the current invention may be practiced in other embodiments that depart from these specific aspects.

For example, a specific IMS environment will be introduced below for illustrating the invention, wherein edge proxy functionalities are implemented on one or more Interrogating Call State Control Functions "I-CSCFs", the user database is implemented on a Home Subscriber Server "HSS", the user registrar is implemented on a Serving Call State Control Function "S-CSCF", and the user proxy is implemented on a Proxy Call State Control Function "P-CSCF". However, it is to be understood that the invention may also be implemented on other functional entities or nodes. With reference to a more general IMS/SIP environment, for example the (SIP) edge proxy functionality may not only be implemented on an I-CSCF, but may additionally or alternatively be implemented on an Interconnect Border Control Function "IBCF" or Session Border Gateway "SBG". Depending on existing or future SIP implementations, also the roles of the user database, user registrar and/or user proxy may each be implemented on one or more appropriate nodes.

Further, the skilled artisan will appreciate that the current invention may in principle be practised in other environments that depart from the SIP environment based on the SIP and Diameter protocol used below to illustrate the present invention. In fact, essentially any protocol, including a proprietary protocol, may be used which enables providing the required signalling indications to the participating entities.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

With regard to the drawings it is noted that those entities which are illustrated in more than one figure are referenced by the same numerals.

Figure 1:
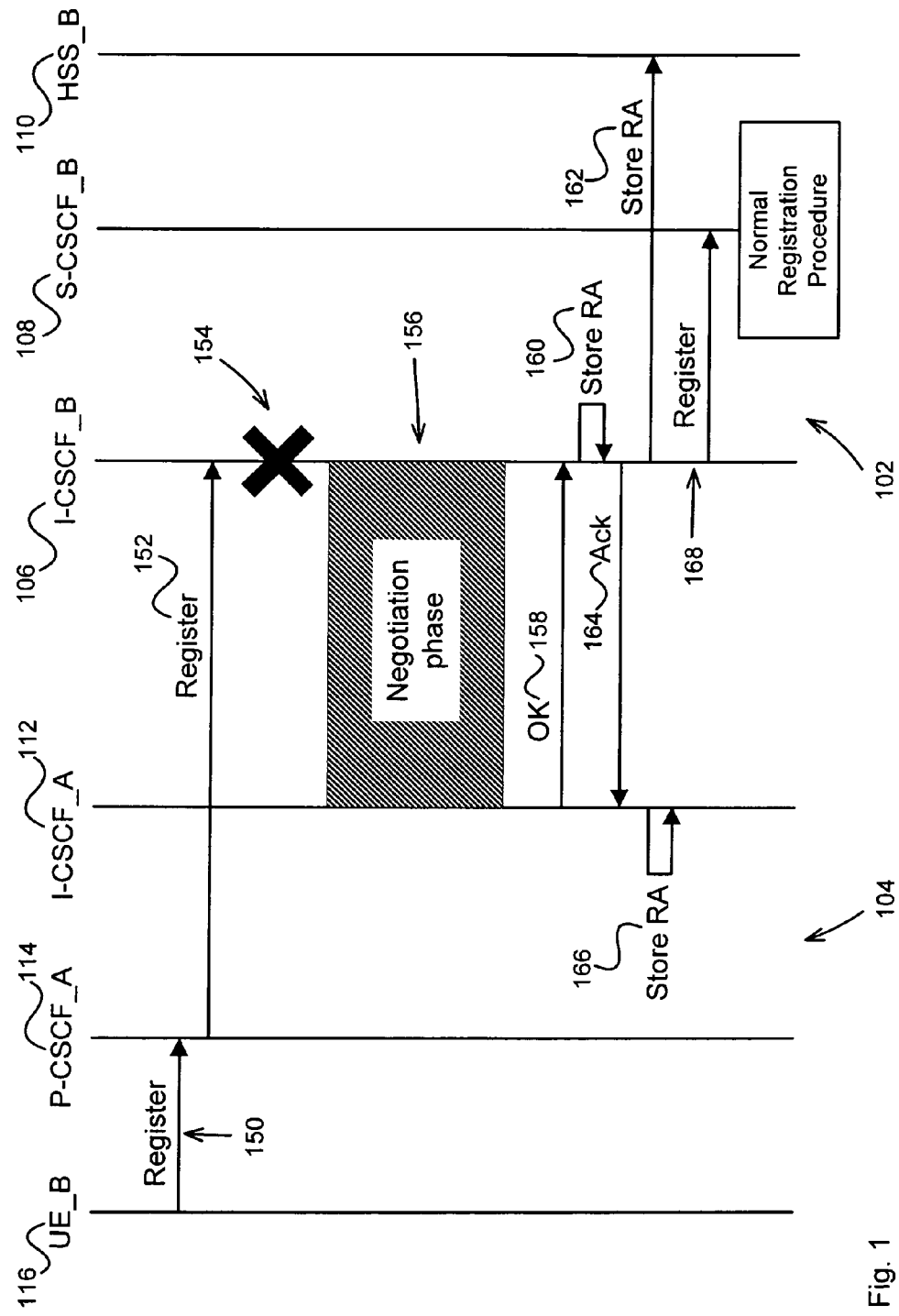
FIG. 1 is a sequence diagram schematically illustrating an automatic establishment of a roaming agreement between two IMS networks.

FIG. 1 illustrates in high-level form an example scenario of how a roaming agreement (RA) may be automatically established between two IMS networks 102 and 104. A User Equipment UE_B 116 is a subscriber of IMS network 102. UE_B 116 is visiting the IMS network 104. With regard to the point of view of UE 116, the network 102 is also referred to as IMS network B, and the network 104 is also referred to as IMS network A. Illustrated in FIG. 1 are the functional entities I-CSSF_B 106, S-CSCF_B 108 and HSS_B 110 of the IMS network B, and I-CSCF_A 112 and P-CSCF_A 114 of IMS network 104 A.

UE_B 116 wants to access IMS services of its home network 102. However, between the IMS networks 102 and 104 no permanent (static) roaming agreement is in place. FIG. 1 illustrates a time point when there is also no automatically established (dynamic) roaming agreement in place, but is automatically established triggered by the registration attempt of UE_B 116. It is assumed that the Diameter and SIP protocol is used for signalling between the components illustrated in FIG. 1 and the following figures.

In step 150, the subscriber UE_B attempts to register to its home network 102 and therefore sends a Register message to the P-CSCF_A 114 of visited network 104. The P-CSCF_A 114 determines the I-CSCF 106 as the I-CSCF of the home network 102 to which to forward the Register message. There may be more I-CSCFs available in network 102 than only I-CSCF_B 106 for communication with network 104. However, in order to clearly illustrate the process of automatic roaming agreement establishment, only the I-CSCF_B 106 is depicted in FIG. 1. The case of roaming agreement management in case of multiple I-CSCFs in network 102 will be discussed in detail further below.

In step 152, the P-CSCF_A 114 forwards the register message to the I-CSCF_B 106. The details of the forwarding step 152, such as gathering an IP address of the I-CSCF 106, the existence of a protected channel on network level between the networks 104 and 102 are known to the skilled person and are therefore omitted here. In step 154, the I-CSCF_B 106 checks whether a roaming agreement exists with network 104 in order to decide whether to forward the Register request to the S-CSCF_B 108. As illustrated by the cross in FIG. 1, it is assumed that the I-CSCF_B 106 determines in step 154 that no roaming agreement is in force yet between networks 102 and 104. Thus, the UE_B 116 is not able to register at its home network 102.

Triggered by the failed registration attempt of UE-B 116, in step 156 the entities 106 and 112 of networks 102 and 104, respectively, negotiate a roaming agreement which is valid for at least the particular subscriber 116. The negotiation in step 156 may consist of an offer/answer procedure which may comprise one or more cycles.

The I-CSCFs 106 and 112 are normally the first point of contact between the IMS networks 102 and 104 and therefore form the negotiating partners in step 156. In other embodiments, the negotiation function or a similar functionality related to an automatic establishment of roaming agreements may additionally or alternatively be located in other nodes of an IMS network. For example, such functionality may be located in an S-CSCF in the home IMS network, which may negotiate a roaming agreement with a P-CSCF in the visited network. In other examples, such functionality may be located in an application server or in a dedicated node. In such embodiments, the I-CSCF may relay the signalling, e.g. the registration request, to the dedicated node. However, when considering for example that the roaming agreement negotiated in step 156 may be provided not only for roaming user 116 but for other users roaming in network 104 as well, using the I-CSCFs of the networks for the automatic roaming agreement establishment process appears advantageous.

When both parties agree on a roaming agreement, in step 158 an OK message is sent and in step 164 an acknowledgement (ACK) message is sent back in order to finalize the negotiation phase 156. While in FIG. 1 it is illustrated that the OK is sent from the visited network to the home network, it is noted that the OK may also be sent from the home network to the visited network and the ACK may be sent from the visited network to the home network.

As indicated by steps 160 and 166, the negotiated roaming agreement is stored in the corresponding I-CSCFs 106 and 112, respectively, and is also stored in the corresponding user databases, wherein only the step 162 of storing the agreement in HSS 110 is illustrated in FIG. 1. In step 168 the procedure for registering user UE_B 116 is performed in the same way as would have been performed when in step 152 a (permanent or dynamic) roaming agreement would have been in force already.

The roaming agreement negotiated in step 156 may cover the user identity of user 116 or of a group of users. The roaming agreement may further indicate the services a roaming user is allowed to access, possibly including predefined QoS characteristics, and technical parameters required for setting up and tearing down sessions between the IMS domains 102 and 104. Such parameters may relate to, e.g., maximum bandwidths, data volumes, etc., and possibly an expiry date of the roaming agreement. Further, while generally a roaming user may request a service from its home network, an automatic negotiation such as that indicated in step 156 can also comprise an agreement that a roaming subscriber may use services of the visited network.

After the roaming agreement of FIG. 1 has been established, it may also be valid for other users attempting to register via visited network 104 in their home network 102 (and for users of network 104 roaming in network 102). In case the roaming agreement cannot be taken as it is for these subsequent users, the roaming agreement may be adapted, i.e. updated, in response to a further registration request. An update procedure of the roaming agreement may include a further negotiation phase similar to that indicated with step 156 in FIG. 1. An update procedure may also be triggered by other events, e.g. at a predetermined point in time, the provision or activation of a new service, etc.

An automatically established (dynamic) roaming agreement may be valid for a limited or unlimited period of time. Even in case no expiry date has been defined for the roaming agreement, there may be events leading to its termination, e.g. when a negotiated maximum amount of data has been transferred or in case the visited IMS is a temporary IMS network which is switched off at a certain point in time.

The following description focuses on roaming agreement management in an IMS network having multiple I-CSCFs designated for communication with another IMS network. It is assumed that at most a single roaming agreement should be in place between any two IMS networks. While in principle other configurations may be possible, additional problems may arise in such configurations with regard to consistently and efficiently serving roaming users.

Figure 2:
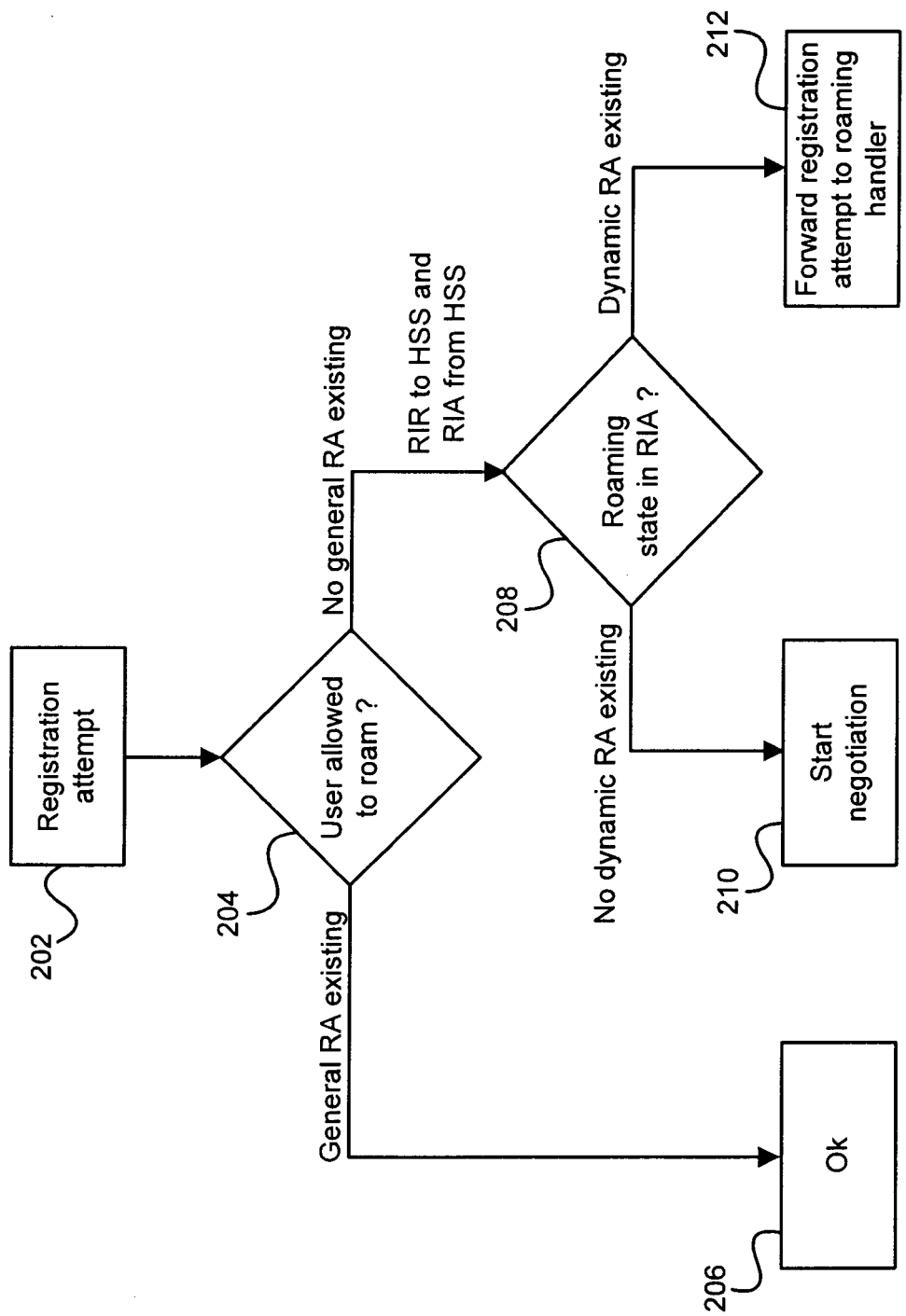
FIG. 2 is a flow diagram schematically illustrating a handling of a registration attempt of a visiting user in an IMS network.

FIG. 2 illustrates an embodiment of a general approach of managing roaming agreements in an IMS network having designated multiple I-CSCFs. The procedure according to FIG. 3 may be implemented in an I-CSCF or similar edge proxy node of an IMS network. In step 202, the I-CSCF receives a registration attempt from a roaming user forwarded by a P-CSCF of a visited network. The reception of the registration attempt triggers that in step 204 the I-CSCF requests information regarding a general (permanent) roaming agreement from a HSS or similar user database. The HSS provides an indication to the I-CSCF whether a general roaming agreement exists which would allow the user from which the registration attempt originates to roam in the visited network. A general roaming agreement may, e.g., be valid for all times and/or any user of the network to which the I-CSCF in FIG. 2 belongs to. In case such a general roaming agreement (RA) exists, in a step 206 registration of user 202 would be performed, e.g. the I-CSCF would forward the registration attempt to an appropriate S-CSCF.

Figure 3:
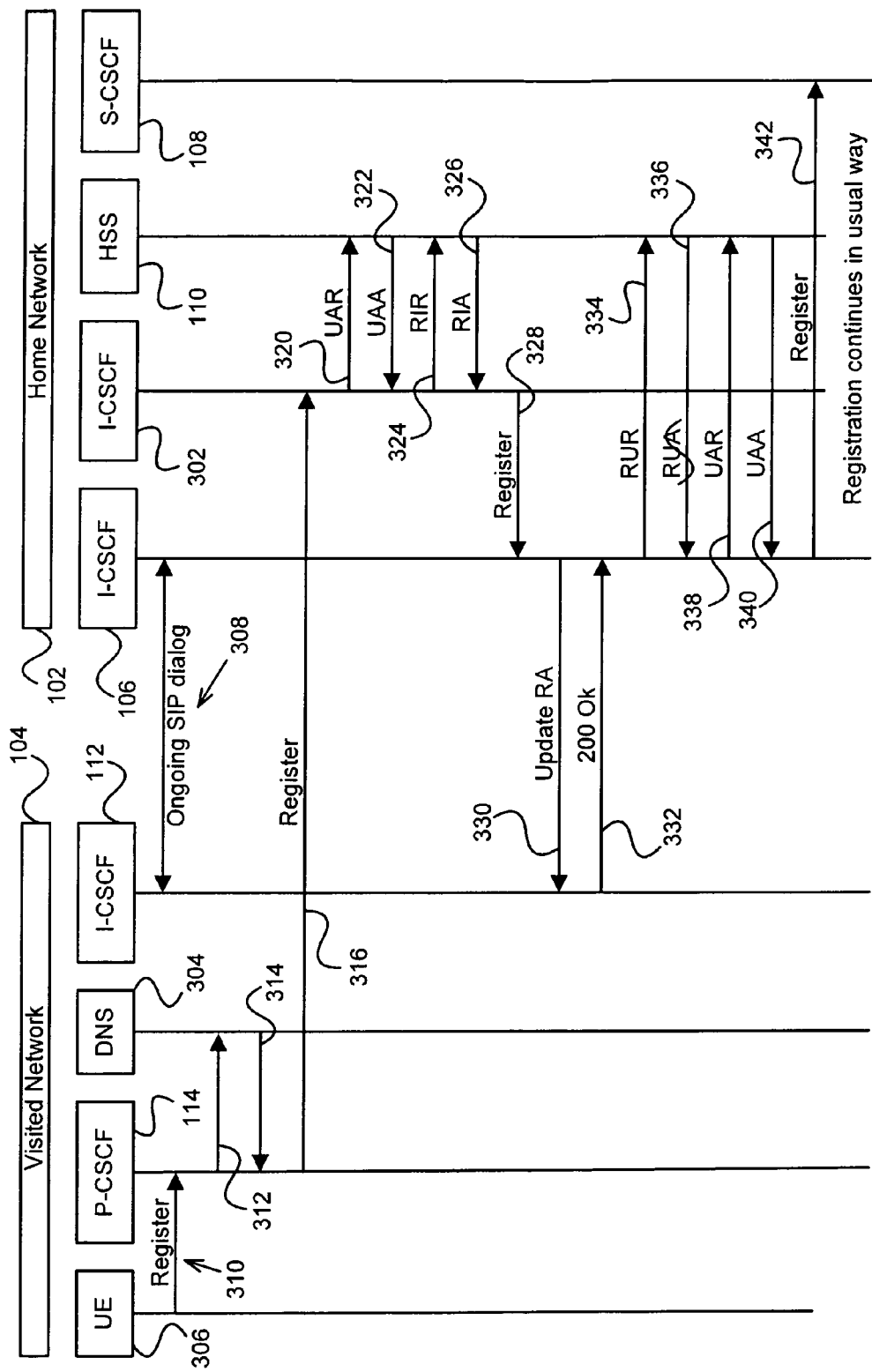
FIG. 3 is a message sequence diagram schematically illustrating a message sequence related to a handling of a registration attempt of a visiting user in IMS networks.

According to the procedure illustrated in FIG. 3, in case no permanent or general roaming agreement exists, the I-CSCF does not deny the registration but performs a further message exchange 208 with the HSS or user database. Specifically, the I-CSCF requests from the HSS information indicating whether a dynamic roaming agreement exists between the involved networks. The further behaviour of the I-CSCF then depends on the answer from the HSS. In case no dynamic roaming agreement exists, the I-CSCF starts in step 210 with negotiating a dynamic roaming agreement with the visited network. The negotiation may take place as has been described with regard to the negotiation phase 156 of I-CSCF 106 illustrated in FIG. 1. In case however a dynamic roaming agreement exists already, the I-CSCF acts in step 212 to forward the registration attempt received in step 202 to the I-CSCF in charge of handling the current roaming agreement.

While the procedure of FIG. 2 has been described as being applied for automatically established roaming agreements, it is in principle also applicable for manually established roaming agreements.

FIG. 3 illustrates in more detail a specific embodiment of the procedure outlined in FIG. 2. As before, the procedure relates to the handling of a registration attempt of a visiting user in its home network comprising multiple I-CSCFs. The example scenario of FIG. 3 refers to the home IMS network 102 and visited IMS network 104 which have been introduced in FIG. 1. Over those entities which have been discussed already, the home network 102 is depicted as comprising a further I-CSCF 302. A DNS server 304 is associated to the visited network 104. A user of user equipment (UE) 306 is subscribed in the network 102 and is visiting network 104.

For purposes of illustration it will be assumed in the following that the procedure of FIG. 1 has been performed earlier in time, i.e. a roaming agreement has been established between home network 102 and visited network 104, wherein the I-CSCFs 106 and 112 are in charge of the roaming agreement and are involved in a corresponding ongoing SIP dialog 308. The dialogue 308 is kept alive as long as the roaming agreement exists.

In step 310, the UE 306 sends a SIP Register message to the P-CSCF 114 of visited network 104. In step 312, the P-CSCF 114 sends a query to DNS server 306 for an indication of an I-CSCF to contact in the home network 102 of UE 306. As multiple I-CSCFs are available at home network 102, namely entities 106 and 302 and possibly more I-CSCFs, the DNS server 304 returns an address of an I-CSCF based on, for example, a round robin mechanism in order to in this way ensure load balancing between the multiple I-CSCFs of network 102. In the example configuration of FIG. 3, the DNS server 304 responds in step 314 with providing an address of the I-CSCF 302 back to the P-CSCF 114 and the P-CSCF 114 correspondingly forwards in step 316 the Register message of UE 306 to I-CSCF 302. The reception of this message corresponds to step 202 of FIG. 2.

Based on the example of network 102 in FIG. 3, a problem is illustrated which may occur in networks with multiple I-CSCFs: A dynamic roaming agreement has been negotiated between networks 102 and 104; specifically the I-CSCF 106 is in charge of maintaining the dynamic roaming agreement by means of the SIP dialogue 308. However, the I-CSCF receiving a registration attempt from visited network 104 may be a different one than the I-CSCF 106 involved in the existing roaming agreement between the two networks 102 and 104. Such configuration may be avoided, for example, by implementing a single boarder gateway concept. With reference to FIG. 3, for example the P-CSCF 114 might be configured to send any registration attempts to the I-CSCF 106. In such a configuration, a load balancing would then have to be implemented internally in home network 102. However, according to the techniques described herein a different approach is proposed which offers more flexibility and efficiency.

At the time of reception of the registration attempt in step 320, the I-CSCF 302 has no information available about a roaming agreement and the status thereof between networks 102 and 104, as the roaming agreement is only handled in the I-CSCF 106. In step 320, the I-CSCF requests from HSS 110 information on whether a general roaming agreement exists with network 104 which would allow user 306 to roam therein, and uses the Diameter User Authentication Request (UAR) command for this purpose. With the User Authentication Answer (UAA), the HSS provides in step 322 an indication to the I-CSCF 204. The UAA indicates to the I-CSCF 302 that no general roaming agreement exists with network 104. The UAR/UAA message pair in steps 320 and 322 implement step 204 of FIG. 2.

Corresponding to step 208 of FIG. 2, the I-CSCF 204 requests in step 324 from HSS 110 information on a dynamic roaming agreement between networks 102 and 104. The request is implemented as a Diameter "Roaming Information Request" (RIR). The HSS 110 returns in step 326 a corresponding Diameter "Roaming Information Answer" (RIA). The RIR/RIA message pair will be described in more detail further below. As it is assumed that a dynamic roaming agreement is in place, the I-CSCF 204 acts in step 328, which corresponds to step 212 of FIG. 2, to forward the Register message received in step 316 to the I-CSCF in charge of handling the current roaming agreement, i.e. to the I-CSCF 106.

In steps 330 and 332 the I-CSCFs 106 and 112 perform an appropriate re-negotiation of the existing roaming agreement in order that user 306 is also covered by the agreement. In step 334, the I-CSCF 106 informs the HSS 110, based on a Roaming Update Request (RUR) message, of the re-negotiated roaming agreement allowing user 202 to roam in visited network 104. The HSS 110 indicates in step 336 successful update of the data related to the roaming agreement based on a Roaming Update Answer (RUA). In step 338, the I-CSCF 106 repeats the UAR unsuccessfully tried by the I-CSCF 302 in step 320. As the roaming agreement has been updated meanwhile by the responsible I-CSCF 106, the HSS 110 responds with a UAA in step 340 indicating that a registration of roaming user 306 is permitted. Consequently, the I-CSCF 106 forwards the Register message received in step 328 in step 342 to S-CSCF 108. The registration process will further continue in the normal way.

FIG. 4a illustrates an information element (IE) which may be sent in the RIR in step 324 of FIG. 3 from the I-CSCF 302 in response to the reception of a registration attempt of a visiting user to the HSS. The IE 'Visited Network Identifier' may comprise an indicator of the visited network 104 in home network 102. This information element may be mandatory ('M').

FIG. 4b illustrates information elements which may be sent in the RIA in step 326 in FIG. 3 back from the HSS 110 to the I-CSCF 302. The RIA may comprise an information element 'Roaming State' indicating a state of a roaming agreement which may control the further behaviour of the I-CSCF 302 as discussed for example with regard to step 208 in FIG. 2. The status indication may extend over the mere indication of whether or not there is a roaming agreement existing for the visited network indicated in the RIR. Possible state indications may comprise, for example, "Established", "Terminated", "Early". While the former are self-explaining, the state "Early" may indicate that a roaming agreement is currently in the negotiation phase of similar preparatory phase, i.e. an I-CSCF may already be in charge of the roaming agreement, but the agreement itself is not currently in place.

Further, the RIA may comprise the 'Roaming Template' IE, which field may comprise a roaming agreement template, which would then (step 210 in FIG. 2) to be used by the receiving I-CSCF to start negotiating a roaming agreement with an interrogating counterpart in the visited network. Still further, the RIA may comprise the 'Roaming Handler' IE which, in order to enable forwarding of the registration attempt to the responsible I-CSCF, indicates this responsible I-CSCF. For the example scenario of FIG. 2, the Roaming Handler IE would indicate an IP address, SIP URI, or similar address of the I-CSCF 106 handling the SIP dialogue 308 with visited network 104.

In FIG. 4b only the Roaming State information element is indicated as mandatory IE ('M'), while the other IEs may optionally ('O') be included, dependent on the roaming agreement state. Other implementations may also be considered. For example, in one implementation, no Roaming State IE is available, but the I-CSCF receiving the RIA has to indirectly conclude the state from the received IE 'Roaming Template' or 'Roaming Handler'. For example, in case a RIA contains a Roaming Template IE, the I-CSCF may conclude that no roaming agreement is currently in place, and will start negotiation. In case a RIA contains a Roaming Handler IE, the I-CSCF may conclude that a roaming agreement is in place and that the indicated I-CSCF is in charge thereof. In this way the Roaming State IE may be seen as obsolete.

It turns out, however that in certain implementations providing the Roaming State IE as a mandatory field is advantageous. Consider, for example, a situation of an ongoing roaming agreement negotiation. In this situation, direct knowledge of the roaming state can be used as a control input to influence the further behaviour of the I-CSCF receiving the RIA. For example, in case a state 'Early' (or 'Currently under negotiation' or a similar indication) signals to the receiving I-CSCF that, on the one hand, it should not try to establish itself a further roaming agreement, but that, on the other hand, it should momentarily not forward a registration attempt message to the negotiating I-CSCF. A possible reaction to the roaming state 'Early' may be to repeat the sending of the RIR to the HSS after a predetermined time span has been elapsed. As a result, the (mandatory) inclusion of the 'Roaming State' IE ensures proper handling of the received registration attempt.

In case the I-CSCF sending the RIR and receiving the RIA is itself in charge of handling the roaming agreement, an optimized signalling scheme may be employed. As this I-CSCF has already all required information available. For example, in an implementation in which only the Roaming State IE is a mandatory IE, this field may carry a specific value indicating that the receiving I-CSCF is itself in charge of the roaming agreement with the visited network indicated in the RIR.

In FIGS. 2 and 3 it is illustrated that there are two message exchanges between the I-CSCF and the HSS, namely (referring to FIG. 2) the UAR/UAA message pair in steps 320 and 322, and the RIR/RIA message pair in steps 324 and 326. Providing the communication between I-CSCF and HSS in the form of two separate message exchanges minimizes the additional implementation efforts and additional adaptations required for IMS networks employing multiple I-CSCFs, as this procedure leaves the conventionally known UAR/UAA message exchange entirely or in part unaltered. However, in case a minimization of network traffic/signalling is more desirable, instead of two message exchanges, a single message exchange may only be performed. For example, the information element "Visited Network Identifier" of FIG. 4a may also be included in the UAR and/or the HSS 110 may be adapted to, in response to the reception of a visited network ID in an UAR, search for both, general (permanent) and dynamic (temporary) roaming agreements with the visited network as indicated. In this case, the UAA may already include one or more of the information elements illustrated in FIG. 4b. In this way, one message exchange could be saved.

Figure 5:
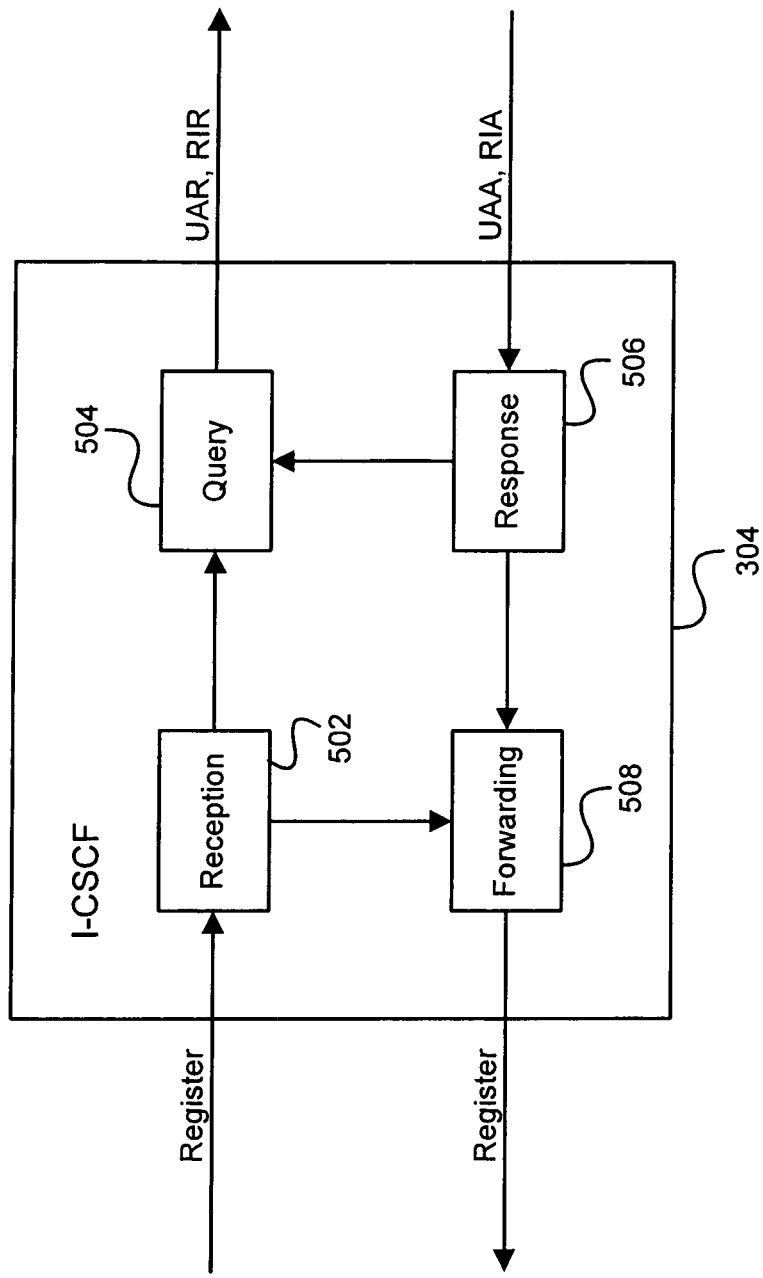
FIG. 5 schematically illustrates functional building blocks of a first I-CSCF of FIG. 3.
Figure 6:
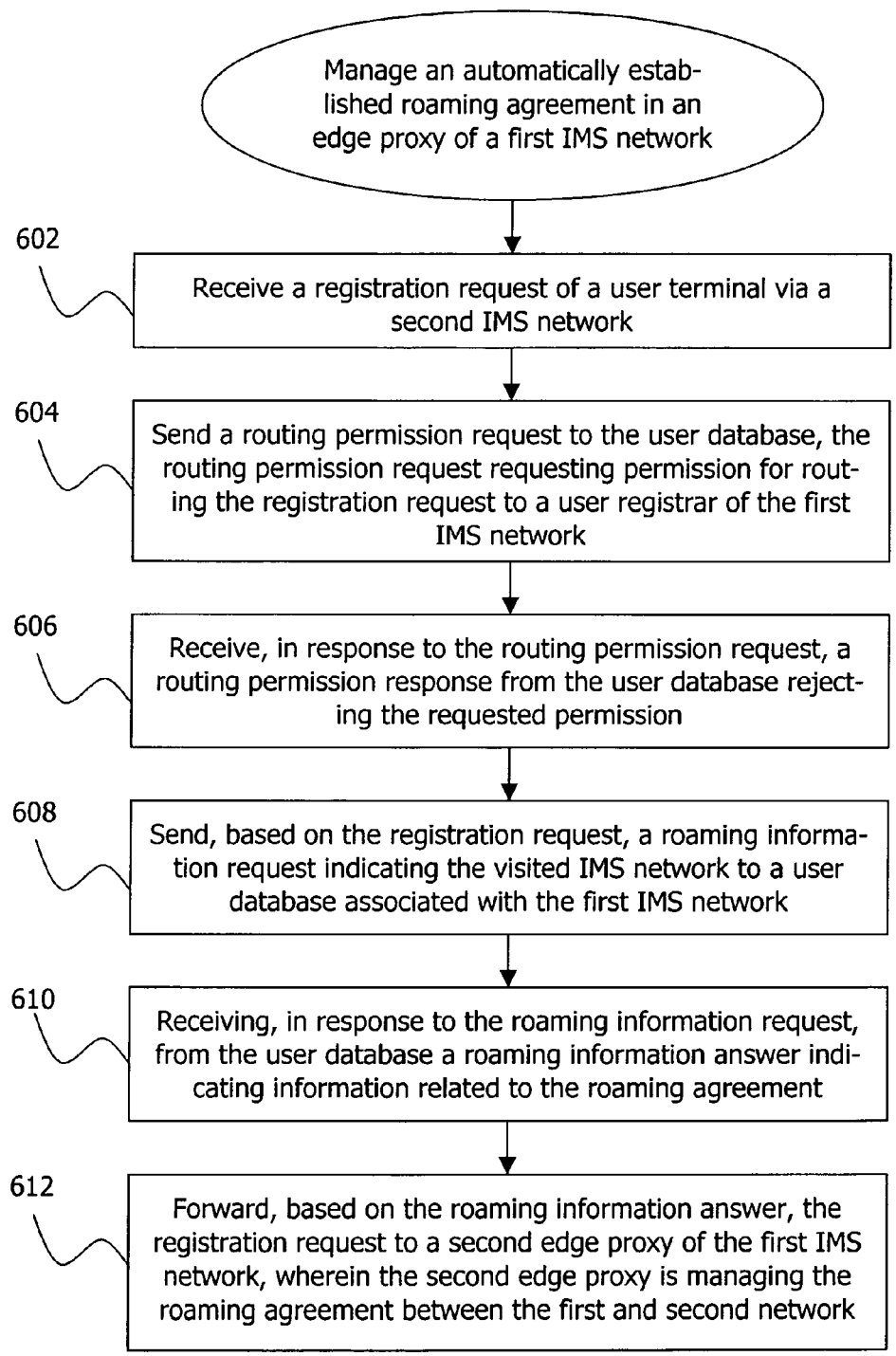
FIG. 6 is a flow diagram illustrating an operation of the I-CSCF of FIG. 5.

FIG. 5 schematically illustrates functional building blocks of an exemplary implementation of the I-CSCF 302 of FIG. 3. The I-CSCF 302 comprises a reception component 502, a query component 504, a response component 506, and a forwarding component 508. The components of I-CSCF 304 may be adapted for communication based on the Diameter and/or SIP protocol. Generally, the I-CSCF 302 operates to manage an automatically established roaming agreement in the IMS network 102. An exemplary operation of the I-CSCF 302 will now be described with reference to the flow diagram of FIG. 6, which refers to the scenario of FIG. 3 from the perspective of the I-CSCF 302.

In step 602, the reception component 502 receives a registration request from UE 302 via visited network 104 (step 316 in FIG. 3). The reception component 502 provides the visited network identifier included in the registration attempt to the query component 504 which is thereby triggered to send, in step 604, a routing permission request, more specifically an UAR, to the HSS 110 (step 320). The UAR requests permission for routing the registration request to a user registrar of network 102, more specifically to an S-CSCF. In step 606, the response component 506 receives, in response to the UAR, a roaming information answer from the HSS 110, more specifically an UAA (step 322). The UAA rejects the requested permission, as there is no general roaming agreement established between networks 102 and 104.

In step 608, the query component 504 operates to send, in response to the rejecting UAA, a RIR to the HSS 110 (step 324 in FIG. 3). The RIR indicates, based for example on the IE illustrated in FIG. 4a the visited network 104 to HSS 110. In step 610, the response component 506 receives in response to the RIR a RIA from HSS 110 (step 326), wherein the RIA contains one or more of the IEs illustrated in FIG. 4b. Based on the information received with the RIA, the forwarding component 508 acts in step 612 to forward the registration request received in step 602 to a further I-CSCF, namely I-CSCF 106 of network 102, which has been indicated in the RIA.

Figure 7:
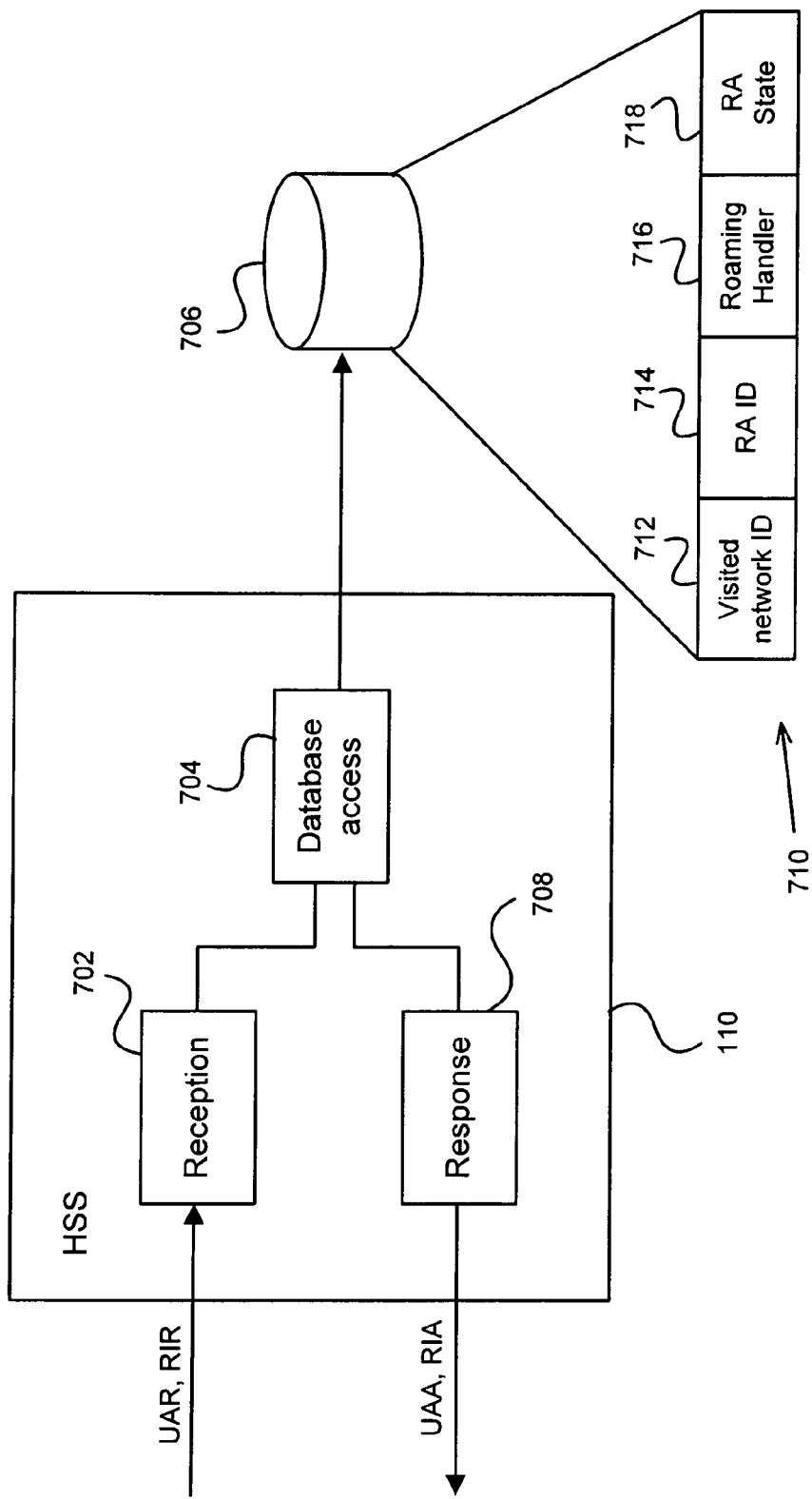
FIG. 7 schematically illustrates functional building blocks of an HSS of FIG. 3.
Figure 8:
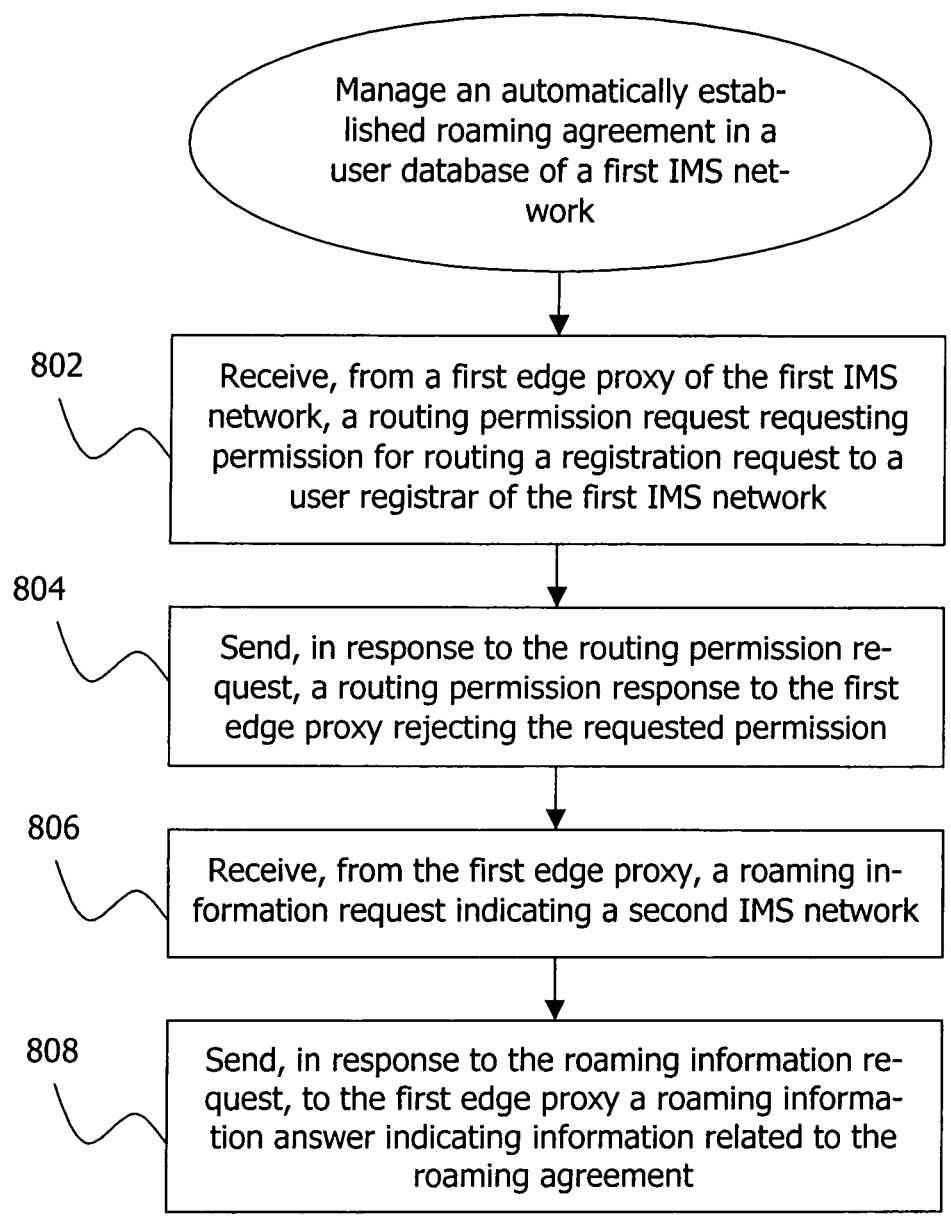
FIG. 8 is a flow diagram illustrating an operation of the HSS of FIG. 7.

FIG. 7 schematically illustrates functional building blocks of an exemplary implementation of the HSS 110 of FIG. 3. The HSS 110 comprises a reception component 702, a database access component 704, an associated database 706 and a response component 708. The components 702 and 708 may be adapted for communication based on the Diameter and/or SIP protocol. Generally, the HSS 110 operates for contributing to a management of automatically established roaming agreements in the IMS network 102. An exemplary operation of the HSS 110 will now be described with reference to the flow diagram of FIG. 8, which refers to the scenario of FIG. 3 from the perspective of the HSS 110.

In step 802, an UAR from I-CSCF 302 is received by the reception component 702 (step 320 in FIG. 3). In response to the reception of the UAR, the database access component 704 accesses database 706 to determine whether a general roaming agreement between networks 102 and 104 exists. As in the example discussed here no such general roaming agreement exists, in step 804 the response component 708 constructs an UAA message rejecting routing permission for the registration attempt of visiting user 306 and sends the UAA back to the I-CSCF (step 322).

In step 806, the reception component 702 receives from the I-CSCF 302 a RIR (step 324 in FIG. 3). In response to the reception of the RIR, the database access component 704 accesses database 706 in order to determine whether there is a dynamic roaming agreement between networks 102 and 104. Specifically, access component 704 accesses look-up table 710 which will be described in more detail below. As a result, in step 808 the response component 708 provides a RIA to the I-CSCF 302, wherein the RIA indicates the roaming handler, i.e. the I-CSCF 106 which is in charge of the existing dynamic roaming agreement between networks 102 and 104. The RIA may for example comprise the IEs "Roaming State" and "Roaming Handler" as illustrated in FIG. 4b.

The lookup table 710 in FIG. 7 exemplarily illustrates a structure of data records which may be stored in database 706 in order to enable the HSS 110 to efficiently react to a request for information on a dynamic roaming agreement. A data record in the lookup table 710 may comprise a field 712 for representing an indication of a visited network identifier ('Visited Network ID'), a field 714 for representing an indication of a dynamic roaming agreement ('RA ID'), a field 716 may be provided for indicating a roaming handler ('Roaming Handler'), and a field 718 may be provided for representing a state of the dynamic roaming agreement ('RA state'). Further fields may be provided depending on implementation.

The Visited Network ID in field 712 is be related to the indications of visited networks delivered by the registration attempts of roaming users, i.e. for example to the content of the IE 'Visited Network Identifier' illustrated in FIG. 4a and provided in a RIR to the HSS 110. The indication of the roaming handler in field 716 may be, for example, an address, such as an IP address, a SIP URI, or similar indication pointing to the I-CSCF in charge of a dynamic roaming agreement. The field 718 may indicate states such as "Early" or "Negotiating", "Established", or "Not Existing", "Expired", etc. depending on the current state of the roaming agreement, as discussed above.

While lookup table 710 of FIG. 7 represents only one example of a data structure enabling the HSS to respond to a RIR, in general the HSS should have efficient access to an association of a visited network identifier and a roaming handler. The IP address, host ID, etc. of the roaming handler might exist at least as long as the roaming agreement is in place. In some implementations, the roaming handler address may still be accessible in case the roaming agreement has expired. For example, in some configurations a dynamic roaming agreement with another network might always be negotiated and maintained by one and same I-CSCF.

In another implementation, the table to be accessed in order to respond to a dynamic roaming information request may comprise a list of roaming agreements, which would require that the HSS for each request has to scan the entire list in order to identify the respective visited network. However, the table could be configured efficiently by, for example, indexing it according to visited network identifier. Such structure is seen as corresponding to the structure 710 as illustrated in FIG. 7.

Figure 9:
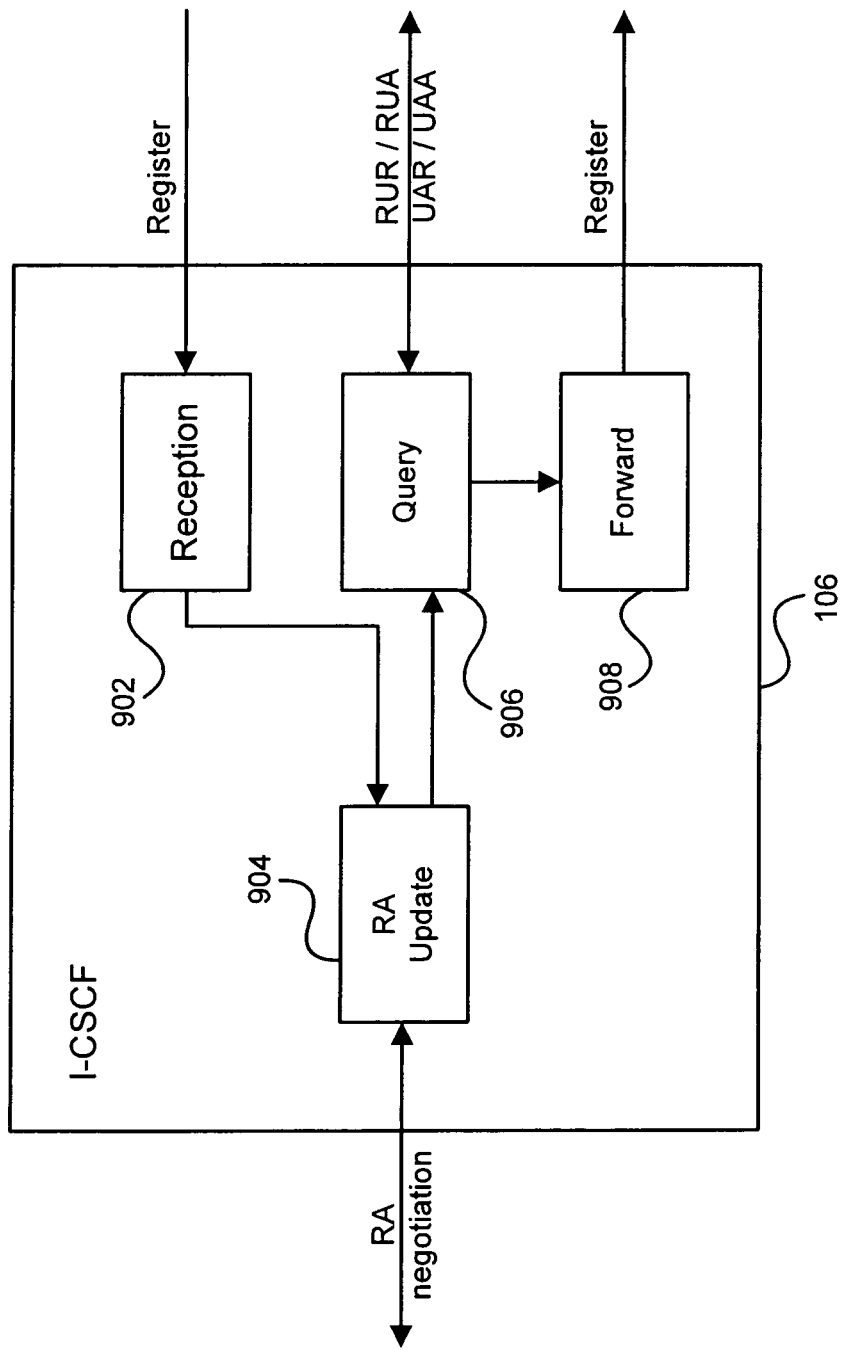
FIG. 9 schematically illustrates function building blocks of a second I-CSCF of FIG. 3.
Figure 10:
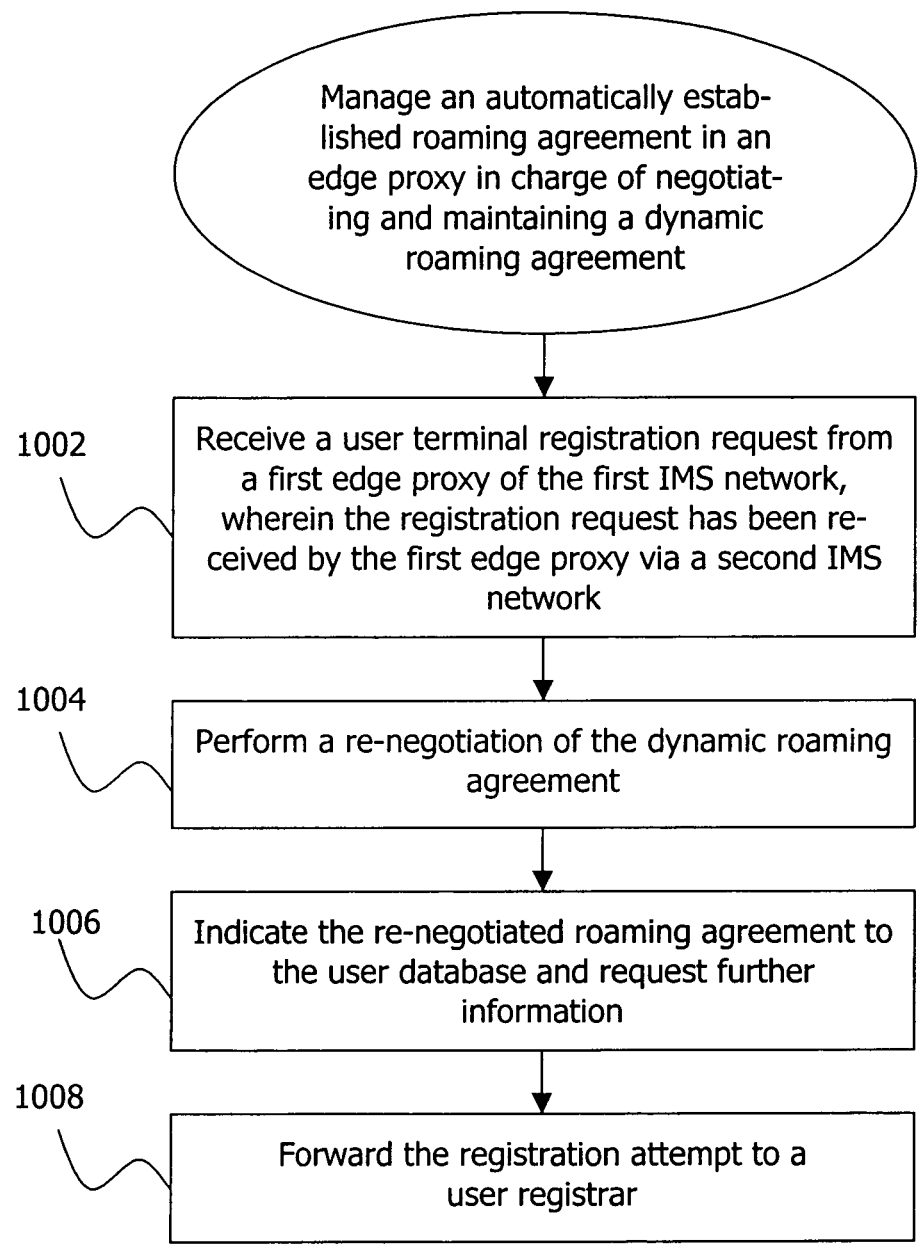
FIG. 10 is a flow diagram illustrating an operation of the I-CSCF of FIG. 9.

FIG. 9 schematically illustrates functional building blocks of an exemplary implementation of I-CSCF 106 of FIG. 3 which is in charge of negotiating and maintaining the dynamic roaming agreement with I-CSCF 112 of visited network 104. The I-CSCF 106 implementation in FIG. 9 comprises a reception component 902, a RA update component 904, a HSS request component 906 and a forwarding component 908. An exemplary operation of the I-CSCF 106 will now be described with reference to the flow diagram of FIG. 10 which refers to the scenario of FIG. 3 from the perspective of the I-CSCF 106.

In step 1002, the reception component 902 receives a registration attempt (step 328 in FIG. 3) from I-CSCF 302 of network 102. In response to the reception of the registration attempt, the update component 904 performs a re-negotiation of the dynamic roaming agreement in place between networks 102 and 104 (steps 330, 332). After successful re-negotiation, the component 906 indicates in step 1006 the re-negotiated roaming agreement to the HSS 110 (steps 334, 336). Moreover, the component 906 operates to request from the HSS 110 information regarding the dynamic roaming agreement according to the procedure illustrated in steps 338 and 340 in FIG. 3. In step 1008, the component 908 forwards the registration attempt received in step 1002 to the S-CSCF 108 (cf. FIG. 2).

While in conventional IMS network implementations normally only the S-CSCF is stateful, according to the techniques proposed herein also the I-CSCF is stateful with regard to dynamic roaming agreements. Generally, it is proposed that an I-CSCF in charge of negotiating and maintaining a dynamic roaming agreement is configured stateful, i.e. it remembers the details of the roaming agreement negotiated with the other network and has access to information regarding the current state of the roaming agreement. For example, the I-CSCF 106 in FIG. 3 in charge of the dynamic roaming agreement between networks 102 and 104 is stateful in that it keeps track of the dynamic roaming agreement and maintains a corresponding SIP dialogue with the corresponding I-CSCF 112 in network 104.

As it is proposed herein that at most one dynamic roaming agreement between any two IMS networks exists and that one specific I-CSCF is in charge of a dynamic roaming agreement in a network, another I-CSCF in that network cannot react consistently to the reception of a registration attempt from a roaming user. The reason is that this I-CSCF has no information about the state of a roaming agreement, i.e. it does not know whether such RA is existing or is to be established. For example, the I-CSCF 302 in FIG. 3 has not any state information available at the time the registration attempt is received in step 320. Therefore, the I-CSCF 302 cannot handle the attempt correctly after the HSS 110 has announced in step 322 that no general roaming agreement is in place.

For this reason, the I-CSCF receiving a registration attempt must be enabled to receive information regarding a dynamic roaming agreement. In this respect, in the example embodiments above the RIR/RIA message pair is introduced. The information contained in the RIA enables the I-CSCF to either (dependent on implementation) start negotiating a dynamic roaming agreement or to forward the registration attempt to the I-CSCF in charge of the dynamic roaming agreement. This latter I-CSCF may re-negotiate the roaming agreement accordingly. Thus, all registration attempts pertaining to a given dynamic roaming relationship may arrive at a particular I-CSCF which enables an efficient handling of the roaming agreement on the one hand and the user registrations related to the roaming agreement on the other hand.

While in the example embodiments described herein an I-CSCF is in charge of managing a roaming agreement, in general the proposed functionality may be implemented on any appropriate node, i.e. any SIP proxy, edge proxy, SIP proxy server, border proxy server, etc. may be chosen.

The techniques proposed herein contribute to a comprehensive framework for enabling an automatic establishment of roaming agreements between IMS networks. The proposed techniques enable a consistent management of roaming agreements. Techniques known or discussed for managing general or permanent roaming agreements can be re-used to a large extent.

When employing the proposed techniques, an IMS network having initially only a single I-CSCF or edge proxy for communication with other IMS networks can easily be extended to multiple I-CSCFs. Further, the proposed techniques contribute to minimizing processing resource usage and network traffic between nodes. Optimizations to existing procedures have also been indicated herein, which may contribute further to minimizing network traffic and/or processing resource usage. Complex situations with parallel roaming agreements and/or a shift of roaming agreements responsibility to other nodes can be avoided. No new nodes needs to be established in order to implement the proposed techniques.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for managing an automatically established roaming agreement in a first Internet Protocol (IP) Multimedia Subsystem (IMS) network, the method being performed in a first edge proxy of the first IMS network and comprising:
   receiving a registration request of a user terminal via a second IMS network;
   sending, based on the registration request, a roaming information request indicating the second IMS network to a user database associated with the first IMS network;
   receiving, in response to the roaming information request and from the user database, a roaming information answer indicating information related to the roaming agreement;
   forwarding, based on the roaming information answer, the registration request to a second edge proxy of the first IMS network, wherein the second edge proxy is configured to manage the roaming agreement between the first and second IMS networks;
   sending a routing permission request to the user database, the routing permission request requesting permission for routing the registration request to a user registrar of the first IMS network; and
   receiving, in response to the routing permission request, a rejecting routing permission response from the user database rejecting the requested permission;
   wherein sending the roaming information request to the user database comprises sending the roaming information request to the user database in response to the received rejecting routing permission response.

2. The method according to claim 1, wherein the roaming information answer indicates the second edge proxy.

3. The method according to claim 1, wherein the automatically established roaming agreement comprises a dynamic roaming agreement with an expiry time, and the roaming information answer comprises an indication of a state of the dynamic roaming agreement.

4. The method according to claim 1, wherein sending the roaming information request and the routing permission request to the user database comprises sending a single message comprising the routing permission request and the roaming information request to the user database.

5. The method according to claim 4, wherein the single message represents a Diameter User Authorization Request command.

6. The method according to claim 1, further comprising:
   determining, based on the received routing permission request, if a permanent roaming agreement between the first and second IMS networks exists,
   wherein the rejecting routing permission response is sent when no permanent roaming agreement between the first and second IMS networks exists.

7. The method according to claim 1, wherein the roaming information answer comprises a roaming agreement template for establishing a roaming agreement between the first and the second IMS network.

8. The method according to claim 1, wherein the communication between the first edge proxy and the user database is based on Diameter messages.

9. A method for managing an automatically established roaming agreement in a first Internet Protocol (IP) Multimedia Subsystem (IMS) network, the method being performed in a user database associated with the first IMS network and comprising:
   receiving, from a first edge proxy of the first IMS network, a roaming information request indicating a second IMS network;
   sending, in response to the roaming information request to the first edge proxy, a roaming information answer indicating information related to the roaming agreement;
   receiving a roaming update request responsive to a user terminal registration request received by the first edge proxy via a second IMS network and forwarded by the first edge proxy, based on the roaming information answer, to a second edge proxy of the first IMS network, wherein the second edge proxy manages the roaming agreement between the first and second IMS networks;
   receiving, from the first edge proxy, a routing permission request, the routing permission request requesting permission for routing the registration request to a user registrar of the first IMS network; and
   sending, in response to the routing permission request, a routing permission response to the first edge proxy rejecting the requested permission.

10. The method according to claim 9, wherein the roaming information answer indicates the second edge proxy.

11. The method according to claim 9, wherein the automatically established roaming agreement comprises a dynamic roaming agreement with an expiry time, and the roaming information answer comprises an indication of a state of the dynamic roaming agreement.

12. The method according to claim 9, wherein the roaming information answer optionally comprises a roaming agreement template for establishing a roaming agreement between the first and the second IMS network.

13. The method according to claim 9, wherein the communication between the first edge proxy and the user database is based on Diameter messages.

14. A non-transitory computer program product comprising program code portions for managing an automatically established roaming agreement in a first Internet Protocol (IP) Multimedia Subsystem (IMS) network such that when executed on one or more computing devices in a first edge proxy of the first IMS network, the computer program code portions:
   receive a registration request of a user terminal via a second IMS network;
   send, based on the registration request, a roaming information request indicating the second IMS network to a user database associated with the first IMS network;

receive, in response to the roaming information request and from the user database, a roaming information answer indicating information related to the roaming agreement;

forward, based on the roaming information answer, the registration request to a second edge proxy of the first IMS network, wherein the second edge proxy is configured to manage the roaming agreement between the first and second IMS networks;

send a routing permission request to the user database, the routing permission request requesting permission for routing the registration request to a user registrar of the first IMS network; and receive, in response to the routing permission request, a rejecting routing permission response from the user database rejecting the requested permission;

wherein the computer program sends the roaming information request to the user database by sending the roaming information request to the user database in response to the received rejecting routing permission response.

15. The computer program product of claim 14, wherein the program code portions are stored on a computer readable recording medium.

16. A non-transitory computer program product comprising program code portions for managing an automatically established roaming agreement in a first Internet Protocol (IP) Multimedia Subsystem (IMS) network such that when executed on one or more computing devices in a user database associated with the first IMS network, the program code portions:

receive, from a first edge proxy of the first IMS network, a roaming information request indicating a second IMS network;

send, in response to the roaming information request and to the first edge proxy, a roaming information answer indicating information related to the roaming agreement;

receive a roaming update request responsive to a user terminal registration request received by the first edge proxy via a second IMS network and forwarded by the first edge proxy, based on the roaming information answer, to a second edge proxy of the first IMS network, wherein the second edge proxy manages the roaming agreement between the first and second IMS networks;

receive, from the first edge proxy, a routing permission request, the routing permission request requesting permission for routing the registration request to a user registrar of the first IMS network; and send, in response to the received routing permission request, a rejecting routing permission response to the first edge proxy rejecting the requested permission.

17. The computer program product of claim 16, wherein the program code portions are stored on a computer readable recording medium.

18. A node implementing a first edge proxy and configured to manage an automatically established roaming agreement in a first Internet Protocol (IP) Multimedia Subsystem (IMS) network, the node comprising:

a reception circuit configured to receive a registration request of a user terminal via a second IMS network;

a query circuit configured to send, based on the registration request, a roaming information request indicating the second IMS network to a user database associated with the first IMS network;

a response circuit configured to receive, in response to the roaming information request and from the user database, a roaming information answer indicating information related to the roaming agreement; and a forwarding circuit configured to forward, based on the roaming information answer, the registration request to a second edge proxy of the first IMS network, wherein the second edge proxy is configured to manage the roaming agreement between the first and second IMS networks;

wherein the query circuit is further configured to send a routing permission request to the user database, the routing permission request requesting permission for routing the registration request to a user registrar of the first IMS network; and wherein the response circuit is further configured to receive, in response to the routing permission request, a routing permission response from the user database rejecting the requested permission; and wherein the query circuit sends the roaming information request to the user database by sending the roaming information request to the user database in response to the received rejecting routing permission response.

19. The node according to claim 18, wherein the node is configured to send a single message comprising the routing permission request and the roaming information request sent to the user database.

20. The node according to claim 18, wherein at least one of the first edge proxy and the second edge proxy is implemented as an Interrogating Call State Control Function (I-CSCF), an Interconnect Border Control Function (IBCF), or a Session Border Gateway (SBG), the user database is implemented as a Home Subscriber Server (HSS), and the user registrar is implemented as a Serving Call State Control Function (S-CSCF).

21. The node according to claim 18, wherein the first edge proxy and the user database are configured to communicate with each other using the Diameter protocol.

22. A node implementing a user database associated with a first Internet Protocol (IP) Multimedia Subsystem (IMS) network and configured to manage an automatically established roaming agreement in the first IMS network, the node comprising:

a reception circuit configured to receive, from a first edge proxy of the first IMS network, a roaming information request indicating a second IMS network;

a response circuit configured to send, in response to the roaming information request and to the first edge proxy, a roaming information answer indicating information related to the roaming agreement, wherein the reception circuit is further configured to receive a roaming update request responsive to a user terminal registration request received by the first edge proxy via a second IMS network and forwarded by the first edge proxy, based on the roaming information answer, to a second edge proxy of the first IMS network, wherein the second edge proxy manages the roaming agreement between the first and second IMS networks;

wherein the reception circuit is further configured to receive, from the first edge proxy, a routing permission request, the routing permission request requesting permission for routing the registration request to a user registrar of the first IMS network; and wherein the response circuit is further configured to send, in response to the received routing permission request, a rejecting routing permission response to the first edge proxy rejecting the requested permission.

23. The node according to claim 22, wherein the reception circuit is configured to receive a single message comprising the routing permission request and the roaming information request sent from the first edge proxy.

24. The node according to claim 22, wherein at least one of the first edge proxy and the second edge proxy is implemented as an Interrogating Call State Control Function (I-CSCF), an Interconnect Border Control Function (IBCF), or a Session Border Gateway (SBG), the user database is implemented as a Home Subscriber Server (HSS), and the user registrar is implemented as a Serving Call State Control Function (S-CSCF).

25. The node according to claim 22 wherein the response circuit is further configured to send only a roaming information answer and no routing permission response to the first edge proxy.

26. The node according to claim 22, wherein the first edge proxy and the user database are configured to communicate with each other using the Diameter protocol.

* * * * *

UNITED STATES PATENT AND TRADEMARK OFFICE
CERTIFICATE OF CORRECTION

PATENT NO. : 9,185,141 B2
APPLICATION NO. : 13/320950
DATED : November 10, 2015
INVENTOR(S) : Perkuhn et al.

It is certified that error appears in the above-identified patent and that said Letters Patent is hereby corrected as shown below:

On Title Page 2, in Item (56), under "OTHER PUBLICATIONS", in Column 2, Line 15, delete "Notificaiton"," and insert -- Notification", --, therefor.

In the Specification

In Column 1, Lines 18-19, delete "Tele-communication" and insert -- Telecommunication --, therefor.

In Column 1, Line 56, delete "band-width" and insert -- bandwidth --, therefor.

In Column 9, Line 40, delete "DNS server 306" and insert -- DNS server 304 --, therefor.

In Column 10, Line 14, delete "I-CSCF 204." and insert -- I-CSCF 302. --, therefor.

In Column 10, Line 18, delete "I-CSCF 204" and insert -- I-CSCF 302 --, therefor.

In Column 10, Line 26, delete "I-CSCF 204" and insert -- I-CSCF 302 --, therefor.

In Column 12, Line 13, delete "I-CSCF 304" and insert -- I-CSCF 302 --, therefor.

In Column 12, Line 23, delete "UE 302" and insert -- UE 306 --, therefor.

Signed and Sealed this
Fifth Day of July, 2016

Michelle K. Lee
*Director of the United States Patent and Trademark Office*